United States Patent
Szelagowski (10) Patent No.: US 10,569,832 B2
(45) Date of Patent: Feb. 25, 2020

(54) DRIVE FOR A WHEELED VEHICLE, PARTICULARLY A BICYCLE

(71) Applicant: Michal Szelagowski, Olesnica (PL)

(72) Inventor: Michal Szelagowski, Olesnica (PL)

(*) Notice: Subject to any disclaimer, the term of this patent is extended or adjusted under 35 U.S.C. 154(b) by 0 days.

(21) Appl. No.: 15/539,049

(22) PCT Filed: Dec. 21, 2015

(86) PCT No.: PCT/PL2015/000203
§ 371 (c)(1),
(2) Date: Jun. 22, 2017

(87) PCT Pub. No.: WO2016/108703
PCT Pub. Date: Jul. 7, 2016

(65) Prior Publication Data
US 2017/0369122 A1     Dec. 28, 2017

(30) Foreign Application Priority Data
Dec. 29, 2014  (PL) .......................................... 410797

(51) Int. Cl.
  *B62M 6/60* (2010.01)
  *B62M 6/90* (2010.01)
  *B62M 11/00* (2006.01)
  *B60L 50/20* (2019.01)

(52) U.S. Cl.
  CPC ................. *B62M 6/60* (2013.01); *B62M 6/90* (2013.01); *B62M 11/00* (2013.01); *B60L 50/20* (2019.02); *B60L 2200/12* (2013.01); *B60L 2270/40* (2013.01)

(58) Field of Classification Search
  CPC . B62M 6/40; B62M 6/60; B62M 6/75; B62M 7/12; B62D 59/02; B62D 59/04
  See application file for complete search history.

(56) References Cited

U.S. PATENT DOCUMENTS

| 3,667,190 A | * | 6/1972 | Thornton-Trump | ... A01D 46/20 198/560 |
| 5,487,442 A | * | 1/1996 | Hua | ....................... B62K 11/10 180/220 |
| 5,865,267 A | * | 2/1999 | Mayer | ...................... B62M 6/60 180/206.5 |
| 6,024,186 A | * | 2/2000 | Suga | ........................ B62M 6/60 180/206.5 |

(Continued)

FOREIGN PATENT DOCUMENTS

| JP | 2011131752 A | * | 7/2011 |
| WO | WO9841438 | | 9/1998 |
| WO | WO1054118 | | 5/2010 |

*Primary Examiner* — Joseph M Rocca
*Assistant Examiner* — Felicia L. Brittman
(74) *Attorney, Agent, or Firm* — Cherskov Flaynik & Gurda, LLC (57) ABSTRACT

A drive for a wheeled vehicle having a driven wheel is described. The driven wheel is driven by a gear. The drive includes a support mounted on an axle of the driven wheel and attached to a frame element of the vehicle. A motor is located at the driven wheel. This drive motor is mounted on the support. A second drive gear connected to the drive motor. The second drive gear is also mounted on the support. The second drive gear engages the gear fixed to the driven wheel.

8 Claims, 6 Drawing Sheets

(56) References Cited

U.S. PATENT DOCUMENTS

| | | | |
|---|---|---|---|
| 6,269,898 B1* | 8/2001 | Mayer | B62M 6/60 180/206.5 |
| RE37,583 E * | 3/2002 | Mayer | B62M 6/60 180/206.1 |
| 6,945,343 B1* | 9/2005 | Moreau | B60D 1/246 180/11 |
| 6,991,050 B1* | 1/2006 | Sanford | B62D 53/0857 180/13 |
| 8,002,302 B1* | 8/2011 | Chen | B62H 1/00 280/293 |
| 8,220,578 B2 | 7/2012 | Kerschgens Long | |
| 2002/0038730 A1* | 4/2002 | Bidwell | B62M 7/16 180/15 |
| 2003/0015976 A1* | 1/2003 | Chen | B62K 3/002 318/9 |
| 2003/0111284 A1* | 6/2003 | Chou | B62D 61/02 180/220 |
| 2004/0065495 A1* | 4/2004 | Huang | B62M 6/60 180/220 |
| 2005/0016785 A1* | 1/2005 | Young | B62M 6/60 180/206.5 |
| 2005/0067207 A1 | 3/2005 | Radtke | |
| 2010/0117327 A1* | 5/2010 | Hadley | B62M 6/60 280/214 |
| 2011/0247888 A1* | 10/2011 | Kohlbrenner | B62M 6/70 180/206.7 |
| 2016/0221623 A1* | 8/2016 | Kim | B62H 1/02 |

* cited by examiner

DRIVE FOR A WHEELED VEHICLE, PARTICULARLY A BICYCLE

CROSS-REFERENCE TO RELATED APPLICATIONS

This application claims the benefit as a nationalization of PCT application No. PCT/PL2015/000203, filed on Dec. 21, 2015, which is currently pending, and also claims the benefit of priority to Polish Application Serial Number P.410797 filed on Dec. 29, 2014, which is also presently pending. The contents of each application are hereby incorporated by reference.

BACKGROUND OF THE INVENTION

1. Field of the Invention

This invention is directed to a drive of a wheeled vehicle designed particularly to drive a bicycle that is also equipped with a drive using pedals.

2. Background of the Invention

The object of the invention is a drive of a wheeled vehicle designed particularly to drive a bicycle that is also equipped with a drive using pedals.

A patent description EP 2121423 discloses a construction set and a method of modifying a bicycle and a bicycle. The set comprises a wheel driven by a drive unit. This wheel has a wheel hub for rotatably receiving an axle mounted between arms of a fork. Fastening elements with elements for connection to one of the arms of the fork are arranged on the outer side of the fork. Each of the fastening elements has a bearing for rotatably bearing at least one roller. At least one roller is non-rotatably connected with the driven wheel. Moreover, a device is provided for connecting at least one roller with the drive unit. Each fastening element is formed by a fastening element connected with the fork arm and by a mounting of the roller releasably connected with this element. The element mounted on the fork is connected to the mounting of the roller by means of screws. Elements provided for connecting the fastening element or the element mounted on the fork with a fork arm are formed by at least one screw connection. The element for connecting a fastening element or an element to be mounted on the fork with a fork arm is formed by a U-shaped bracket. At its ends, the bracket has threads to releasably connect with nuts. Additionally, an oblong hole is located on the fastening element or on the element to be mounted on the fork, by the means of which the bracket surrounding a fork arm is mounted.

Therefore, a need exists in the art for an improved system to drive a vehicle, particularly a bicycle.

SUMMARY OF THE INVENTION

An object of the present invention is to vehicle drive that overcomes many of the limitations of the prior art.

The drive of a wheeled vehicle, particularly a bicycle, according to the invention, comprises a drive motor located at a driven wheel and mounted on a support, wherein a gear connected to the drive motor is fixed to the wheel. The drive of the wheeled vehicle is characterized in that the support is mounted on the axle of the driven wheel and on the element of the frame of the wheeled vehicle, and the motor, whose drive gear is able to engage with a gear fixed to the driven wheel, is mounted on the support. The drive motor is an electric motor connected to a battery. The drive motor together with the battery is seated in a common frame at the driven wheel.

The support has a triangular cut-out for mounting on the axes of the driven wheel and has an oblong hole for mounting to the frame of a wheeled vehicle. The support has a recess to support the common frame for the motor and the battery, as well as two holes for mounting it. The common frame for the motor and the battery is provided with a latch, whose locking pin is located opposite the holes of the support. The common frame for the motor and the battery is provided with a tilt foot for supporting a vehicle equipped with the drive. The common frame for the motor and the battery is formed of flat bars, wherein a circular flat bar is connected with screws to the motor and the other flat bars support the battery.

The drive of the wheeled vehicle, particularly a bicycle, according to the invention, is characterized by a particularly simple construction, which allows for mounting the motor together with the battery at the driven wheel. However, what is crucial is the ability to mount the entire drive to each bicycle.

This has been achieved by using a support with a specific shape, and at the same time a common frame for the motor and the battery provided with suitable fastening elements. The support has a triangular cut-out allowing mounting it on axles of various sizes, and the oblong hole allows mounting the support to various bicycle frames. The use of two holes which fasten the common frame for the motor and the battery in two different positions allows mounting the drive permanently in the operating position and in the disconnected drive position. The use of the latch for fastening the common frame with the motor and the battery allows to easily remove the common frame from the bicycle and to take the common frame including the motor and the battery with oneself, thus protecting them against theft.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
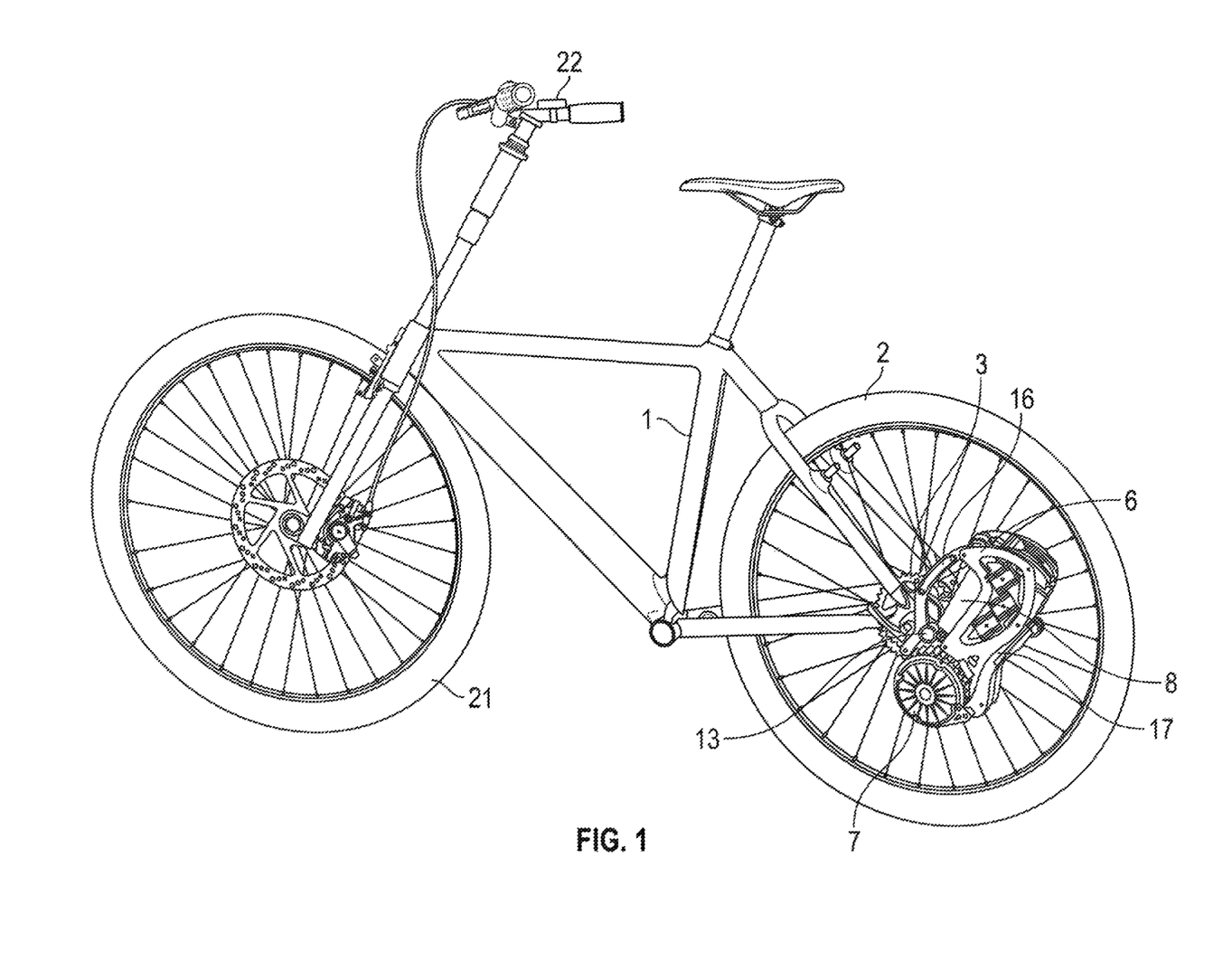
FIG. 1 is an overview of a portion of a two-wheeled vehicle.
Figure 2:
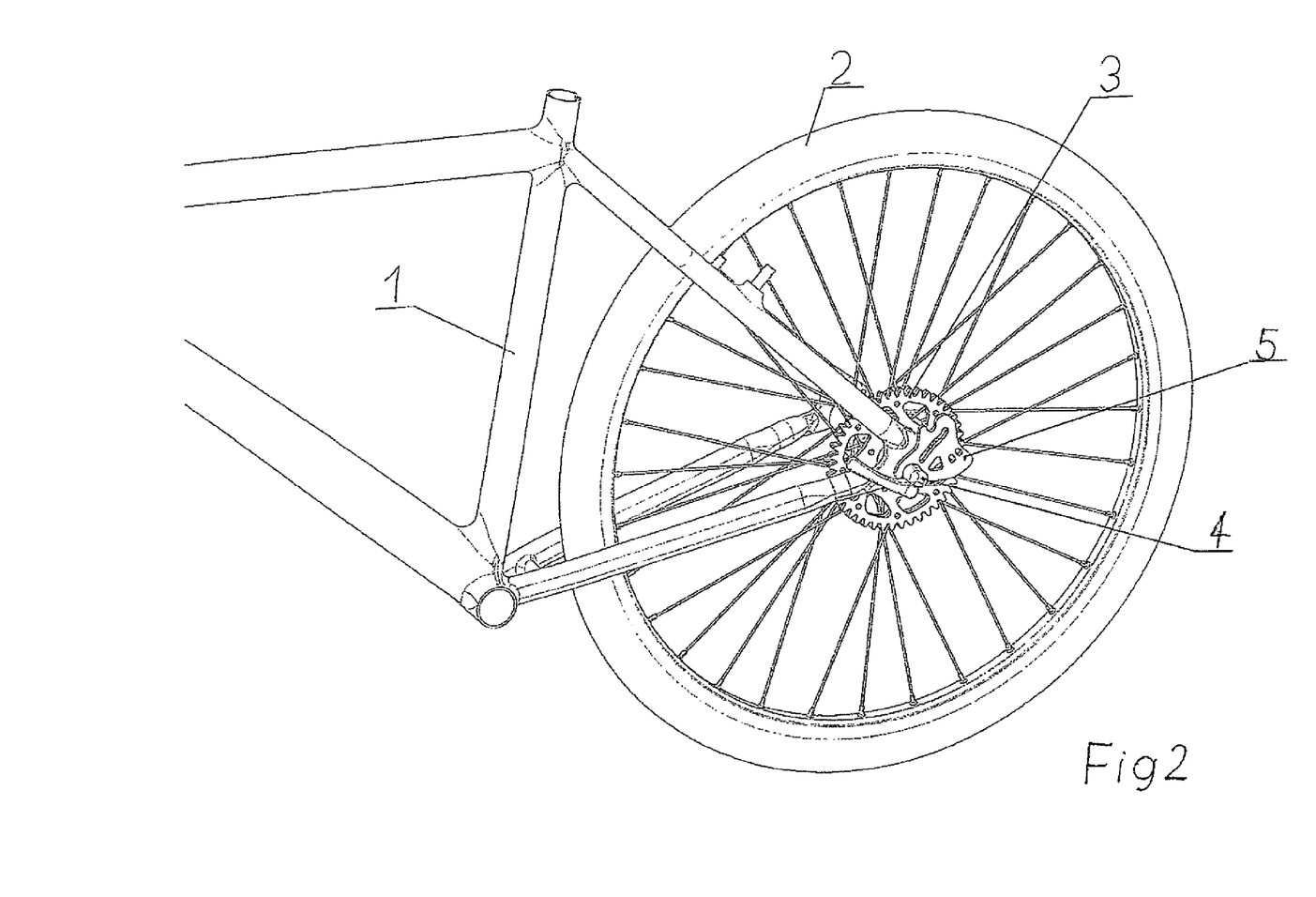
FIG. 2 is an additional view a portion of a two-wheeled vehicle.
Figure 3:
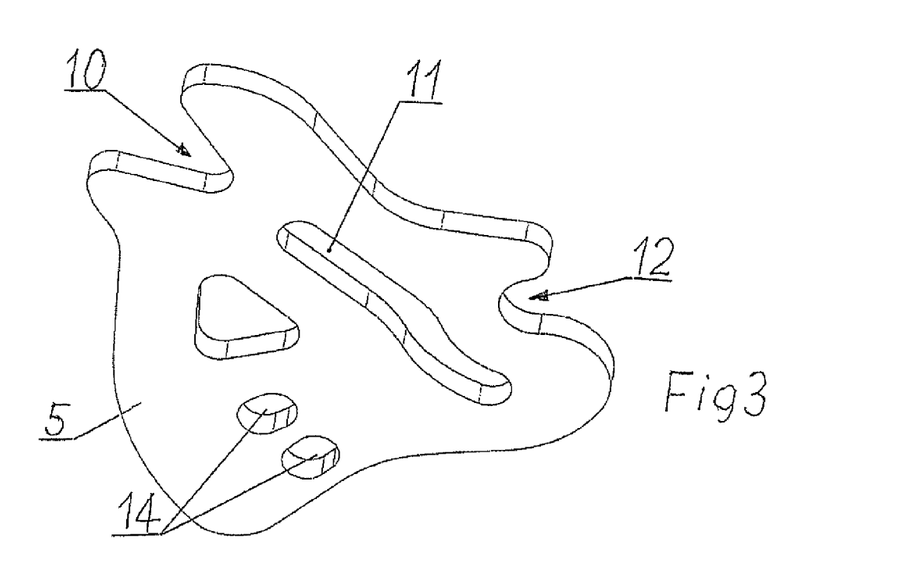
FIG. 3 is an overview of a component used in conjunction with an embodiment of the invention.
Figure 4:
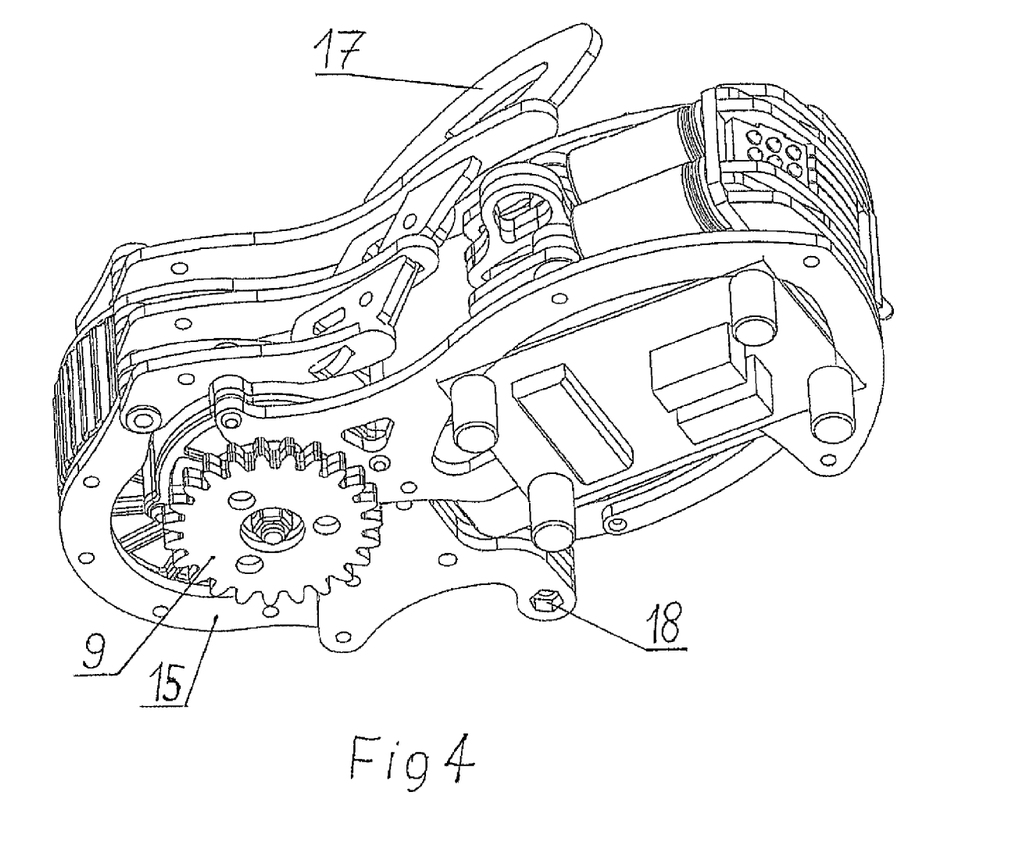
FIG. 4 is a detailed view of an embodiment of the invention.

The drive of the wheeled vehicle, particularly a bicycle, according to the invention, is further explained in the embodiment and in the drawing, where FIG. 1 shows the drive mounted on the bicycle wheel, FIG. 2 shows the support mounted on the bicycle wheel with the frame removed including the motor and the battery, FIG. 3 shows the construction of the support, and FIG. 4 shows the frame including the motor and the battery in an inverted position.

As shown in FIGS. 1 to 4, the bicycle has a frame 1 and a driven wheel 2. A gear 3 is fixed to the driven wheel 2. A support 5 is mounted on the axle 4 of the driven wheel 2, wherein the support 5 is also fixed to the frame 1. A common frame 6 for the motor 7 and the battery 8 is mounted on the support 5.

A small gear 9, which engages with the gear 3 fixed to the driven wheel 2, is mounted on the motor 7 shaft. The motor 7 is powered by the battery 8 also mounted in the common frame 6. The amount of the voltage supplied from the battery 8 to the motor 7 is determined by the controller 22 mounted at the steering wheel 21, operated by the user of the bicycle. The driven wheel 2 receives driving torque from the motor 7 and transforms the torque into tractive force to the road, causing the bicycle to move. The steering wheel 21 turns, with the operation of a rider, to change the direction of the bicycle.

The support 5 has a triangular cut-out 10 provided to be mounted on the axle 4 of the driven wheel 2. The triangular shape of the cut-out 10 allows the mounting of the support 5 on axles of various diameters. Additionally, the support 5 has an elongated hole 11, which is designed for mounting the support 5 on the frame 1 of the bicycle, so that the support 5 is mounted in two places, and the oblong shape of the hole 11 allows mounting the support 5 to various frames 1.

Figure 5:
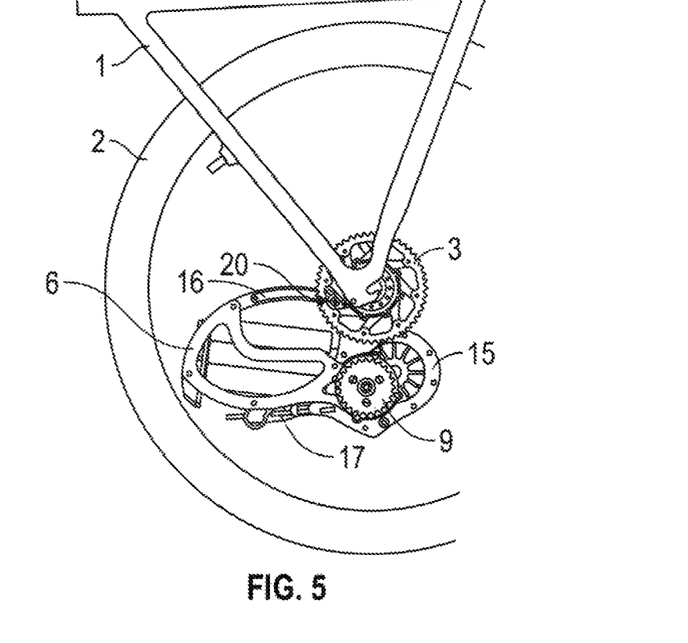
FIG. 5 is detailed side view of an embodiment of the invention, when the gear is disengaged.
Figure 6:
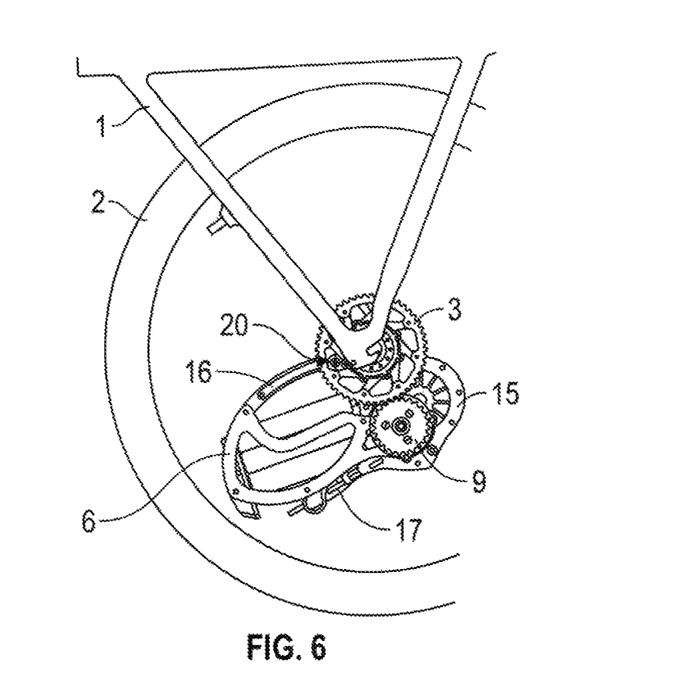
FIG. 6 is detailed side view of an embodiment of the invention, when the gear is engaged.
Figure 7A:
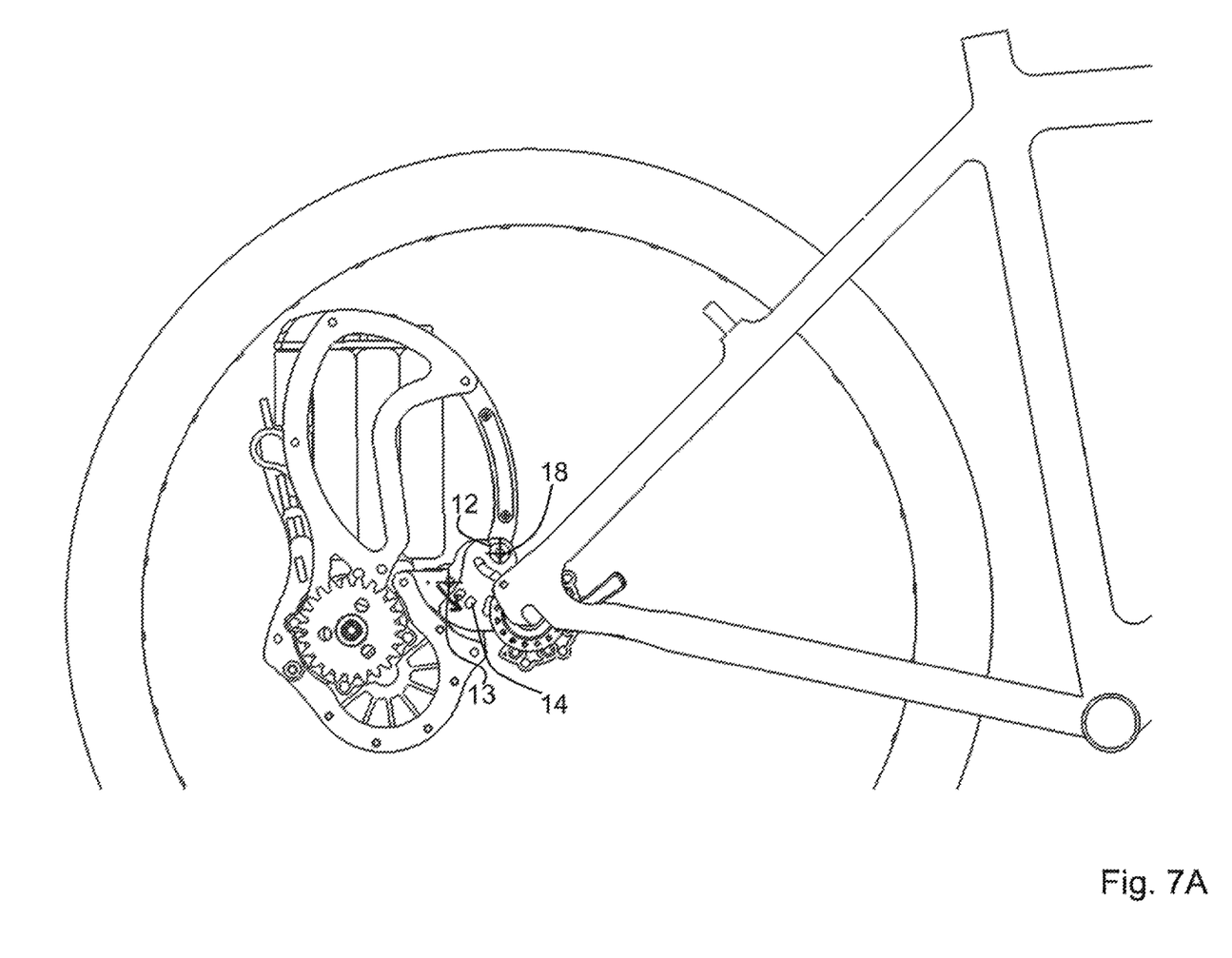
FIGS. 7A and 7B are detailed side views of the invention with the gear fixed to the driven wheel omitted to reveal the details of the locking pin and the holes.
Figure 7B:
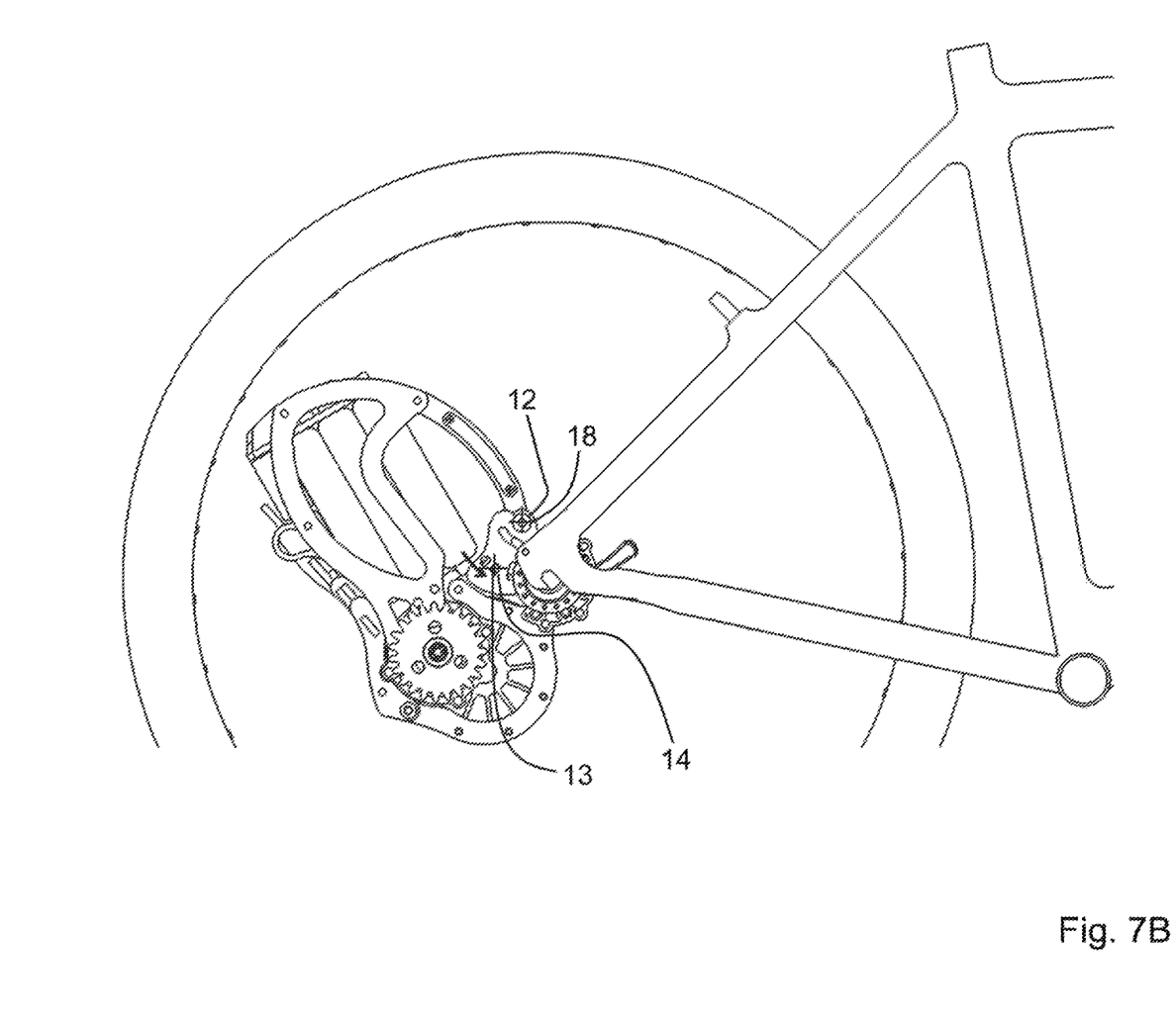

The support 5 and the common frame 6 are constructed so as to allow the disengagement of the small gear 9 of the electric drive from the gear 3 fixed to the driven wheel 2 without dismantle the electric drive completely from the driven wheel. FIG. 6 is detailed side view of an embodiment of the invention, when the gear is disengaged. FIGS. 7A and 7B are side views of the invention with the gear 3 fixed to the driven wheel 2 omitted, showing the details when engaging the small gear 9 from the fixed gear. Another element of the support 5 is a recess 12 (see FIG. 3) used as a prop for the common frame 6. As shown in FIGS. 7A and 7B, when the common frame 6 is amounted onto the support 5, the common frame 6 is supported by the support 5 at its recess 12 through the pin 18, so that the recess 12 and the pin 18 form a pivot point 20 (see FIGS. 5 and 6) around which the common frame 6 can be pivoted relative to the support 5). The support 5 is further provided with two holes 14 which, when the support 5 is mounted on the axle 4, are located at different distances to the axle 4 of the driven wheel 2. The common frame 6 is provided with a latch, whose locking pin 13 is located opposite the holes 14 of the support 5 when the support 5 and common frame 6 are amounted in position. The locking pin 13, upon entering one of the holes 14, determines the position of the common frame 6. This position is also the position of the motor 7, i.e. it is the position of the small gear 9 relative to the gear 3, therefore being the position of engagement of the gears 9 and 3 or their disengagement. When the locking pin 13 is engaged with one of the holes 14 that is located closer to the axle, the small gear 9 is engaged with the gear 3, as shown in FIG. 6. Otherwise, when the locking pin 13 is engaged with the other hole 14 that is located away from the axle, the small gear 9 is disengaged from the gear 3, as shown in FIG. 5. Therefore, the construction of the drive according to the invention allows the disconnection of the electric drive without the need to completely dismantle it. The common frame 6 is formed of flat bars, of which one flat bar 15 has a circular shape, so that it is used to mount the motor 7 to the common frame 6. The frame 6 is also provided with a roll bar 16 designed to carry the common frame 6 including the motor 7 and the battery 8, and it is also provided with a tilt foot 17 designed to support the bicycle. Additionally, the common frame 6 is propped by the support 5 by means of a the pin 18 engaged with the recess 12 and the locking pin 13 engaged with one of the holes 14. In order to remove the common frame 6 from the bicycle, it is necessary only to pull out the locking pin 13 from the hole 14 of the support 5 and remove the pin 18 from the recess 12 of the support 5.

FIGS. 7A and 7B show the steps when engaging the small gear 9 with the gear 3 (not shown). When the locking pin 13 is engaged with the other hole 14 that is located away from the axle, the small gear 9 is disengaged from the gear 3 as shown in FIG. 5. In this state, in order to engage the small gear 9 with the gear 3, the locking pin 13 is pulled out from the other hole 14, as shown in FIG. 7A. the common frame 6 is then pivoted around the pivot point 20 (shown in FIGS. 5 and 6), that is, the recess 12 and the pin 18 as shown in FIG. 7A, along the direction of the arrow. When the common frame 6 is pivoted to a position so that the locking pin 13 is engaged with the one of the holes 14 that is closer to the axle, as shown in FIG. 7B, the gear 9 is moved to a position that is closer to the axle 14 and engaged with the gear 3 (not shown).

In one embodiment, a drive of a wheeled vehicle, particularly of a bicycle, comprising a drive motor located at the driven wheel and mounted on a support, wherein a gear connected with the drive motor is fixed to the wheel, characterized in that the support 5 is mounted on the axle 4 of the driven wheel 2 and on the element of the frame 1 of the wheeled vehicle, and the motor 7, that drive gear 9 is able to engage with a gear 3 fixed to the driven wheel 2, is mounted on the support 5.

In this embodiment the drive motor 7 may be an electric motor connected to the battery 8. Also, in this embodiment, the drive motor 7 together with the battery 8 are placed in a common frame 6 which is in turn connected to the support 5 mounted at and extending from the axle of the driven wheel 2. The common frame 6 defines the frame on which the drive motor 7 and battery 8 are located on.

In some embodiments, the support 5 has a triangular cut-out 10 for mounting on the axle 4 of the driven wheel 2 and has an oblong hole 11 for mounting to the frame 1 of a wheeled vehicle.

In some of these embodiments, the support 5 has a recess 12 to support the common frame 6 for the motor 7 and the battery 8, as well as two holes 14 for mounting it.

Further, in some embodiments, the common frame 6 for the motor 7 and the battery 8 is provided with a latch, whose locking pin 13 is located opposite the holes 14 of the support 5.

The common frame 6 for the motor 7 and the battery 8 may also be provided with a tilt foot 17 for supporting a vehicle equipped with the drive. Further, the common frame 6 for the motor 7 and the battery 8 may be formed of flat bars, of which a circular flat bar 15 is connected with screws to the motor 7 and the other flat bars support the battery.

Finally, the common frame 6 for the motor 7 and the battery 8 can be supported on the support 5 by means of the pin 18 engaged with the recess 12 and the locking pin 13 engaged with one of the holes 14.

The object of the invention is a drive of a wheeled vehicle designed particularly to drive a bicycle that is also equipped with a drive using pedals. The drive of a wheeled vehicle, particularly a bicycle, according to the invention, comprises a drive motor 7 located at a driven wheel 2 and mounted on a support 5, wherein a gear 3 connected to the drive motor 7 is fixed to the wheel 2. The drive is characterized in that the support 5 is mounted on the axle 4 of the driven wheel 2 and on the element of the frame 1 of the wheeled vehicle, and the motor 7, that drive gear 9 is able to engage with a gear 3 fixed to the driven wheel 2, is mounted on the support 5. The drive motor 7 is an electric motor connected to a battery 8. The drive motor 7 together with the battery 8 is seated in a common frame 6 at the driven wheel 2.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A drive for a wheeled vehicle having driven wheel driven by the drive through a fixed gear comprising:
   a support mounted on an axle of the driven wheel and attached to a fixed frame element of the vehicle;
   a drive motor located at the driven wheel, wherein said drive motor is mounted on the support; and
   a second smaller motor gear in mechanical communication with a shaft which is driven by the drive motor, wherein said second gear selectively engages the fixed gear attached to the driven wheel;
   wherein configuration of a locking pin in locking holes in the support selects whether or not the second smaller motor gear engages the fixed gear;
   wherein said motor is an electric drive motor connected to a battery pack also mounted on the vehicle, and, wherein the drive motor and the battery are located on a frame connected to said support which extends from the axle of the driven wheel.

2. The drive of claim 1, wherein said support has a triangular cut out for mounting on the axle of the driven wheel and has an oblong hole for mounting to the frame element of the vehicle.

3. The drive of claim 2, wherein the support also defines a recess to support the frame for the motor and the battery as well as two holes for mounting the frame.

4. The drive of claim 3, wherein the frame for the motor and the battery is supported on the support by means of a second pin engaged with the recess and the locking pin engaged with one of the two holes.

5. The drive of claim 1, wherein the frame for the motor and the battery pivots to and from the fixed gear.

6. The drive of claim 1, wherein the frame for the motor and the battery is provided with a tilting foot to support the vehicle equipped with the drive.

7. The drive of claim 1, wherein the frame for the motor and the battery is formed out of flat bars, wherein one of the flat bars is connected with screws to the motor and the remaining flat bars support the battery.

8. The drive of claim 1, wherein said vehicle is a bicycle.

* * * * *